Nov. 17, 1936.   W. GOSS   2,061,150
PLASTER SUPPORTING DEVICE
Filed March 7, 1931   3 Sheets-Sheet 1

Inventor
William Goss
by Parker & Carter
Attorneys

Nov. 17, 1936.  W. GOSS  2,061,150
PLASTER SUPPORTING DEVICE
Filed March 7, 1931  3 Sheets-Sheet 3
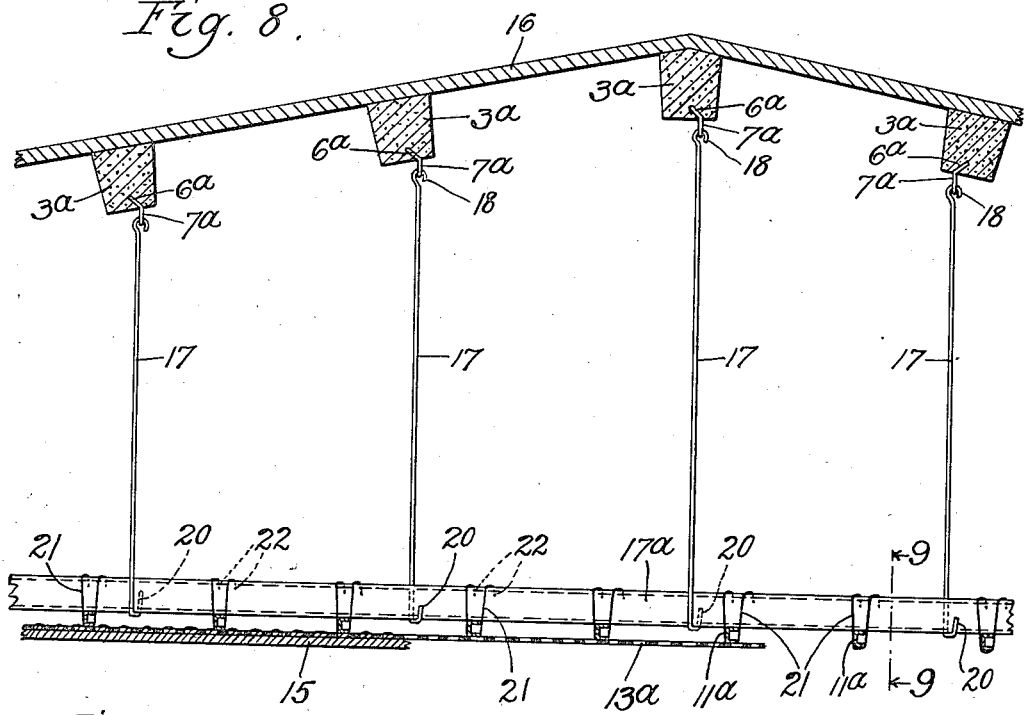
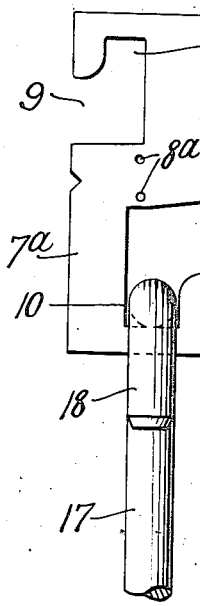
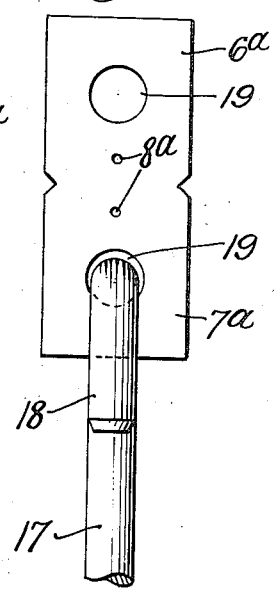
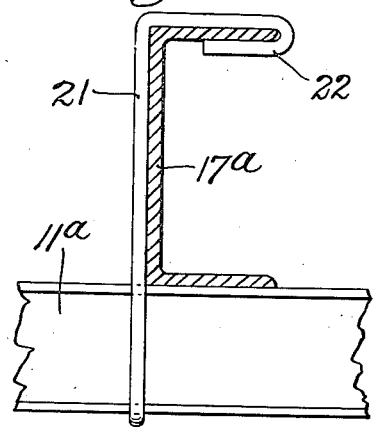
Inventor
William Goss
by Parker & Carter
Attorneys.

Patented Nov. 17, 1936

2,061,150

UNITED STATES PATENT OFFICE 2,061,150

PLASTER SUPPORTING DEVICE

William Goss, Chicago, Ill.

Application March 7, 1931, Serial No. 520,831

6 Claims. (Cl. 72—118)

This invention relates to improvements in plaster supporting devices and has for its object to provide a new and improved device of this description. The invention has as a further object to provide a cheap, efficient and easily applied plaster supporting mechanism for use in connection with concrete structures. The invention has other objects which are more particularly pointed out in the accompanying description.

Referring now to the drawings, Fig. 1 is a view showing the device as applied to a ceiling and before the plaster is applied;

Fig. 8 is a view showing a modified construction;

Fig. 9 is an enlarged sectional view taken on line 9—9 of Fig. 8;

Fig. 10 is an enlarged view showing one of the supports for the lath supporting members showing a modified construction;

Fig. 11 is a view similar to Fig. 10 showing a lath supporting member similar to that shown in Fig. 4.

Like numerals refer to like parts throughout the several figures.

Figure 1:
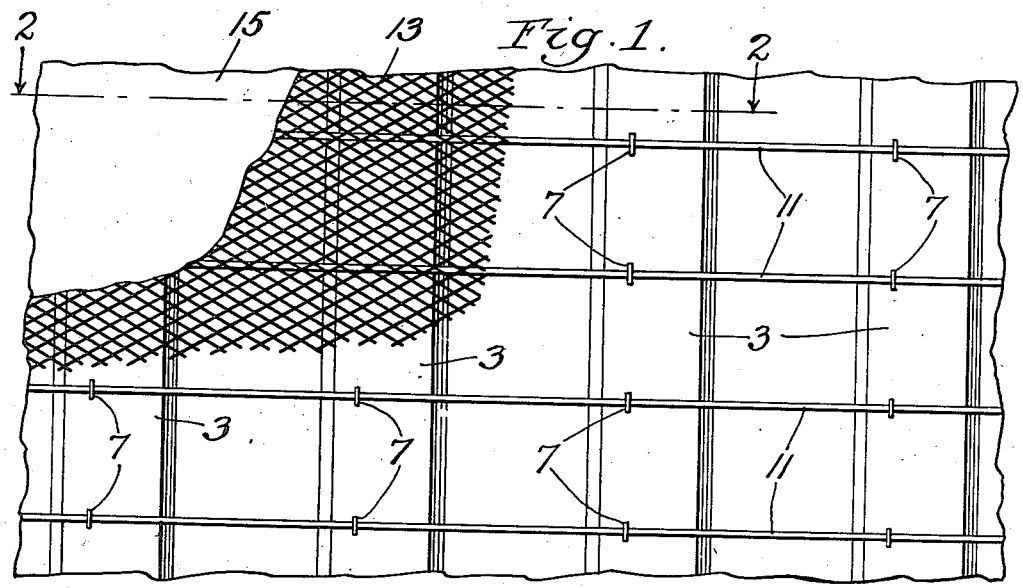

In the drawings I have illustrated the device applied to a ceiling having beams, but it is of course evident that it may be applied to any other form of construction. In this construction I have shown in Fig. 5 a form made up of the members 1 having the laterally projecting parts 2 which are spaced apart to form the beams 3. The laterally projecting parts 2 are fastened to the bottom members 4 which are supported by posts 5 while the concrete is being formed. The members 1 are preferably of metal and the members 4 may be of wood.

Figure 5:
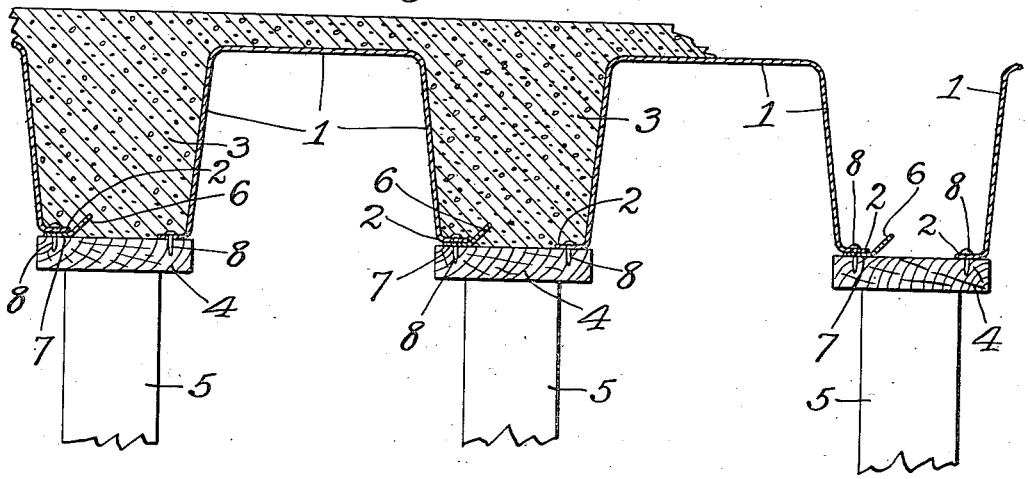
Fig. 5 is a view similar to Fig. 2 showing the moulds for use in forming the concrete ceiling.

Associated with the beams are supports for the lath supporting members which consist of a metal piece having an end portion 6 which is embedded in the concrete and an end portion 7 which projects from the concrete. In forming the concrete structure the two end portions are bent at an angle to each other as shown in Fig. 5, and the end portion 7 is placed under the laterally projecting portion 2 of the form members 1. The form members and the supports for the lath supporting members are held in place by fastening devices 8 which may consist of nails driven into the form members 4, as clearly shown in Fig. 5. When the concrete is applied to the forms, the end 6 of the supports for the lath supporting members are embedded in the concrete.

Figure 6:
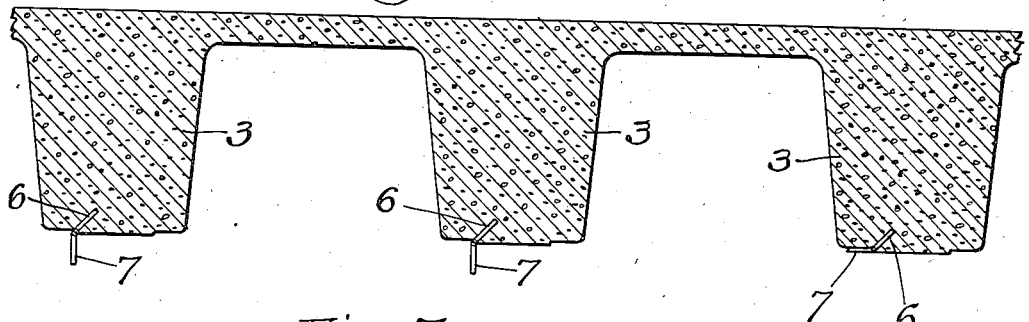
Fig. 6 is a view similar to Fig. 5 after the forms have been removed showing some of the channel supporting members bent downwardly.

After the concrete has properly set, the form members 1 and 4 are removed. It will be seen that these form members can be removed without injury to them and they can be used over and over again. When the form members are removed, the end 7 of the supports for the lath supporting members are exposed as shown on the beam at the right in Fig. 6. These ends are then bent downwardly as shown at the left in Fig. 6. The supports for the lath supporting members are shown in detail in Figs. 3 and 4.

The ends 6 and 7 are provided with laterally extending slots 9 which connect with the receiving spaces 10 for the lath supporting members. The lath supporting members may be of any desired shape, and I have shown them as consisting of channels 11. In order to increase the efficiency of the device and reduce the cost, the supports for the lath supporting members have these slots and receiving spaces for the lath supporting members in both ends, and these lath supporting receiving spaces may be of different sizes so that one device can be used for lath supporting members of different sizes by simply reversing the device and having the end project from the concrete which has the receiving space of the proper size therein.

Figure 3:
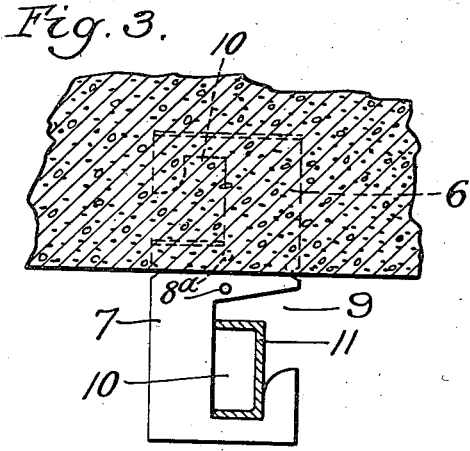
Fig. 3 is an enlarged sectional view taken on line 3—3 of Fig. 2.
Figure 4:
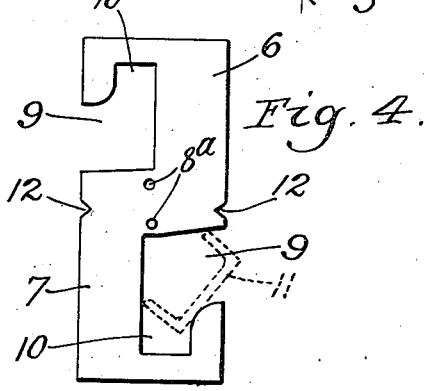
Fig. 4 is an enlarged view of one of the channel supporting members.
Figure 7:
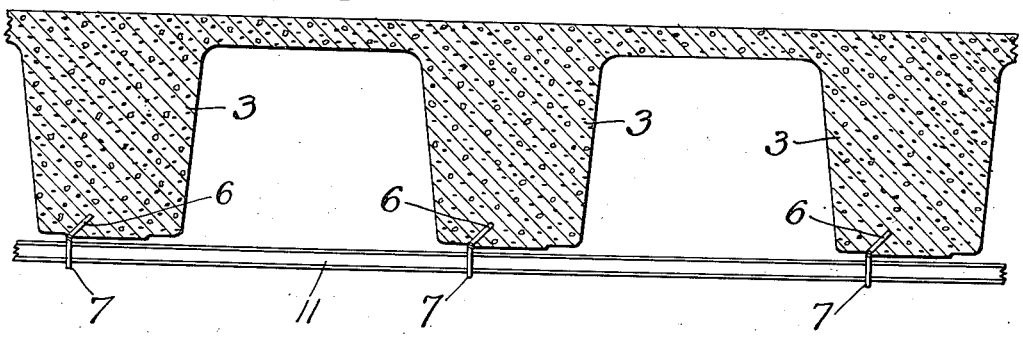
Fig. 7 is a view similar to Fig. 6 showing the channel in position.

When the ends 7 of the supports for the lath supporting members are bent to the proper position, the lath supporting members 11 are inserted through the lateral slots 9 into the receiving spaces 10. Fig. 4 shows in dotted lines the method of inserting these lath supporting members, and Figs. 3 and 7 show one of the lath supporting members 11 in position in the receiving space 10. Since the supports for the lath supporting members are bent near their middle, I prefer to provide notches 12 at one or both sides thereof to insure the proper location of the bend and to make it easier to bend the member in the proper way. It will therefore be seen that these lath supporting members may be quickly and easily slipped into the receiving spaces in their supports. Fig. 1 shows a series of these lath supporting members 11 connected with the end 7 of these supports, the other ends of these supports being embedded in the beams 3. The lath material is then fastened to the supports 11 in any desired manner.

Figure 2:
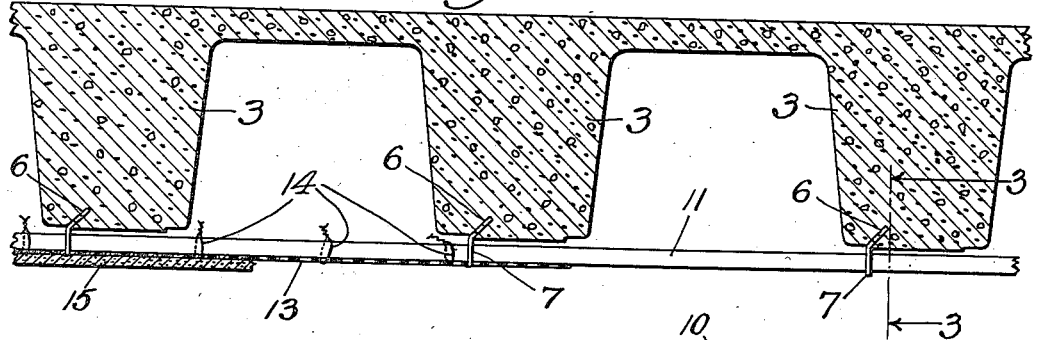
Fig. 2 is a sectional view taken on line 2—2 of Fig. 1.

It is customary to use as laths expanded metal, and I have illustrated in Fig. 2 a method of connecting the expanded metal or laths 13 with the supports 11, which consists in using fastening devices 14 which consist of wires, which are connected with the laths and which are wrapped around the supports 11, their ends being twisted to hold them in place. It will be seen that I have here an efficient construction for supporting plaster, and that this construction can be easily, quickly and cheaply installed and is efficient and effective in properly supporting the plaster 15. The device can be used wherever plaster is required.

The supports for the lath supporting members are preferably provided with the holes 8a for the fastening device 8 which is driven into the form members 4. There are preferably two of these holes, one associated with the end portion 6 and the other with the end portion 7. The fastening device 8 passes through the hole in the end piece which is not embedded in the concrete, as clearly shown in Fig. 5.

In Figs. 8 to 11 I have shown a modified construction particularly adapted for use where there are attics or lofts in the building, or the beams are not of even height and it is desirous to have the ceiling level. In Figure 8 the beams 3a are shown as supporting the roof 16. The supports for the lath supporting members are connected with these beams in the manner heretofore described, the end portion 6a being embedded in the concrete and the end portion 7a being bent down so as to project therefrom after the beams have been formed, as clearly shown in Fig. 8. The lath supporting members 11a in this construction are not directly connected with the supports consisting of the ends 6a and 7a, but are connected thereto by intermediate carrying members 17 and cross members 17a. These carrying members may be rods or of any other form. In the construction shown they are provided at their upper ends with hooks 18 which engage the supports. In Figure 10 they are shown as hooking into holes 19 in these supports; and in Figure 11 they are shown as being hooked into the receiving spaces 10. The carrying members 17 are connected with the cross members 17a in any desired manner, as by means of the hooks 20. Connected with the cross members 17a are the lath supporting members 11a to which are connected the laths 13a. These lath supporting members 11a are connected to the cross members 17a in any suitable manner, as by means of wires 21 which loop around the lath supporting members and which have their ends 22 hooked over the cross member 17a, as shown in Figs. 8 and 9. The plaster 15 is placed on these laths 13a in the ordinary manner. It will be seen that by means of this construction an air space is provided at the top of the building and the ceiling may be easily and quickly placed in position.

The use and operation of my invention are as follows:

The form members 1 and 4 and the posts 5 are placed in position, the supports for the lath supporting members being placed in position with one end under the laterally projecting portion 2 of the form members 1, as clearly shown in Fig. 5. The concrete is then applied so as to embed the ends 6 of these supports in the concrete. The forms are then removed and the ends 7 of the supports for the lath supporting members bent as shown at the left in Fig. 6. The lath supporting members 11 are then placed in the receiving spaces 10, as shown in Figs. 3, 4, 1, and 2. The laths 13 are then connected to the supports 11 by means of the fastening devices 14. The plaster 15 is then applied to the laths.

I claim:

1. In a device of the kind described, a member bent intermediate its ends, both of the bent ends being provided with a receiving space for lath supporting members, and lateral slots connecting with said spaces through which the lath supporting member is inserted, the lateral slots of the two ends being on opposite sides of said member.

2. In a reversible device of the kind described, a member bent intermediate its ends, one end adapted to be embedded in concrete and the other to project therefrom, and connecting means at opposite ends thereof for connecting lath supporting members therewith so they will be supported thereby, and means comprising notches substantially at the middle of said member for locating the bent so that either portion on opposite sides of said bend may be utilized for connecting the lath supporting members thereto.

3. In a device of the kind described, a member adapted to have one end embedded in a concrete part, the member being provided on its opposite ends with receiving spaces for lath supporting members, means in the same plane as the end portions of said member for supporting said lath supporting members, whereby when either end is embedded in the concrete the other end will be in position to support the lath supporting member.

4. In a device of the kind described, a member both of its ends being provided with a receiving space for a lath supporting member, and a lateral slot communicating with said space through which the lath supporting member is inserted, said slots at the two ends of said member being on opposite sides of said member.

5. In a device of the kind described consisting of a lathing, a support therefor, and supporting members for the supports, each having an end extending from the face of the structure and at an acute angle thereto, said other ends projecting from said face substantially perpendicularly thereto and connected with said lath supporting members.

6. In a device of the kind described consisting of a lathing, a support therefor, and supporting members for the supports, each having an end extending from the face of the structure and at an angle thereto, said other ends projecting from said face substantially perpendicularly thereto and being provided with receiving spaces for the lath supporting members, and laterally extending slots communicating with said receiving spaces and through which the lath supporting members are inserted into the lath receiving means, the lower end portion of said lath supports being engaged by said lath supporting members and the portions thereof which support the lath supporting members being in the same vertical plane.

WILLIAM GOSS.